United States Patent [19]

Karol

[11] Patent Number: 5,776,869

[45] Date of Patent: Jul. 7, 1998

[54] TIN STABILIZERS FOR AVIATION LUBRICANTS

[75] Inventor: Thomas J. Karol, Norwalk, Conn.

[73] Assignee: R.T. Vanderbilt Company, Inc., Norwalk, Conn.

[21] Appl. No.: 903,030

[22] Filed: Jul. 29, 1997

[51] Int. Cl.$^6$ .................................................. C10M 155/00
[52] U.S. Cl. .................................................... 508/384
[58] Field of Search ................................. 508/382, 384

[56] References Cited

U.S. PATENT DOCUMENTS

| | | | |
|---|---|---|---|
| 3,245,907 | 4/1966 | Stark et al. | 508/382 |
| 3,322,671 | 5/1967 | Dolle | 508/384 |
| 3,360,467 | 12/1967 | McHugh et al. | |
| 3,674,822 | 7/1972 | Stemniski | |

OTHER PUBLICATIONS

J.R.Stemniski, *Antioxidants for High Temperature Lubricants*, Asle Transactions 7, 43–54 (1964).

*Primary Examiner*—Sharon Gibson
*Assistant Examiner*—Cephia D. Toomer
*Attorney, Agent, or Firm*—Rasma B. Balodis

[57] ABSTRACT

An aviation lubricating oil composition comprises a major amount of base stock oil and a minor amount of triaryltin polyphenyl ether wherein the triaryl groups are phenyl or phenoxyphenol. A method is disclosed for preparation of the tin compounds by reacting polyphenyl ether with t-butyllithium followed by quenching with triphenylstannyl halide.

6 Claims, No Drawings

TIN STABILIZERS FOR AVIATION LUBRICANTS

BACKGROUND OF THE INVENTION

This invention relates to tin polyphenyl ether compounds and their use in aviation lubricants.

Aircraft engines operate under conditions that require lubricants of high quality and stability. Current aviation specifications require that aviation turbine oils meet a number of stringent performance standards. Good oxidative stability and thermal stability is of particular importance.

Synthetic base stock fluids meet the high temperature stability requirements and are particularly advantageous for use as base fluids in aviation lubricants. To further increase oxidation and thermal stability, antioxidants and stabilizers are added to the base fluids.

Bis(p-phenoxyphenyl) diphenyltin, bis(p-phenoxyphenyl)tin, tetrakis(p-phenoxyphenyl)tin and similar tin compounds are disclosed as antioxidants for polyphenyl ether based lubricants by J. R. Stemniski, *Antioxidants for High-Temperature Lubricants*, ASLE TRANSACTIONS 7,43–54(1964).

It has been discovered that the stability of synthetic aviation lubricants can be substantially improved by adding certain polyphenyl ether derivatives of organotin compounds to the lubricating compositions.

SUMMARY OF THE INVENTION

This invention concerns aviation lubricating oil compositions comprising a major amount of aviation base oil and a minor amount of an organotin compound of the formula I

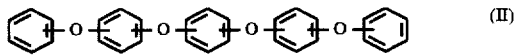 (II)

wherein $X^1$, $X^2$, $X^3$, $X^4$ and $X^5$ are independently selected from hydrogen and a tin group

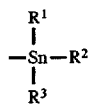

and $R^1$, $R^2$ and $R^3$ are independently selected from phenyl and phenoxyphenyl groups, and isomeric mixtures thereof.

The invention further provides a method for preparation of compounds of formula

Another aspect of the invention provides a method for improving the stability of polyphenyl ether based lubricating compositions by adding organotin compounds of formula I.

DETAILED DESCRIPTION OF THE INVENTION

For lubricating aircraft engines, the lubricants utilize base stock aviation oils. Because of high performance demands, such oils are generally synthetic lubricating oils. One of the best high temperature lubricants are based on polyphenyl ether (PPE) fluids. The PPE base stocks are mixed isomeric five ring polyphenyl ethers and have the general formula II

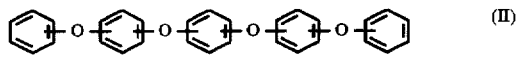 (II)

A representative isomeric mixture consists of m, m, m isomers, m, m, p isomers and p, m, p isomers. The PPE fluids possess good thermal and oxidative stability.

In general, oil base stocks suitable for applications as aviation lubricants will have a viscosity ranging from about 10 to about 1,000 cSt or higher at 40° C.

The stability of the base oils can be improved by adding polyphenyl ether derivatives of organotin compounds of formula I

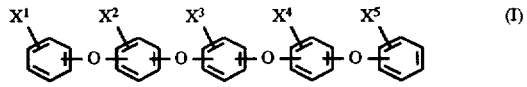 (I)

where $X^1$, $X^2$, $X^3$, $X^4$ and $X^5$ are independently selected from hydrogen and triarylstannyl group.

The compounds are derived by attaching the triarylstannyl group to the backbone of the polyphenyl ether polymer at intervals, which may be at random. When the PPE base stock is used as the starting material, the reaction product will be an isomeric mixture.

In this fashion, an intramolecular antioxidant is formed which is less volatile than the stannyl compound from which it is derived.

The stannyl group can be attached to the backbone benzene ring in the desired amount by adding the specific equivalent of the stannyl group to the phenoxy backbone. A preferred amount is 0.1 to 0.5 equivalent moles of the stannyl group per mole of phenoxy units of the polyphenyl ether. Thus, the amount of tin in the compound will vary depending on the frequency of the phenoxy groups carrying the stannyl groups. For application in aviation lubricants, it is preferred that the compound has at least 5 percent tin to 20 percent tin or higher.

The stannyl substituent group can be in the form of triarylstannyl groups and may be substituted by a phenoxy group. Exemplary groups are triphenylstannyl, p-phenoxylphenyldiphenylstannyl and the like.

The compounds can be prepared by adding the triphenylstannyl groups to the polyphenyl ether backbone by reaction with t-butyllithium followed by quenching with triphenylstannyl chloride in the desired ratios. The reaction using t-butyllithium advantageously allows random proton extraction without the use of other reagents. Any unreacted triphenylstannyl chloride is readily precipitated by washing with caustic. This method gives higher yields than the known synthesis of halogenation of a polyphenyl ether followed by the Grignard reaction with magnesium chloride.

In the synthesis by this method, triphenylstannyl bromide or iodide can be used instead of triphenylstannyl chloride. The reaction is preferably conducted in an inert solvent such as an alkane having from 6 to 10 carbon atoms.

The lubricating oil compositions are prepared by blending the aviation base oil with the organotin compounds of the invention. Preferred amounts are from about 0.05 to 15.0 weight percent based on the lubricating composition.

If desired, other additives known in the art may be added to the lubricating compositions. Such additives include other antioxidants of the amine and phenol type, antiwear agents, rust inhibitors, detergents, pour point depressants, viscosity improvers, friction modifiers and the like.

The high temperature lubricating compositions can be used as aviation turbine oils, military propulsion lubricants and the like.

The following examples are given for the purpose of illustrating the invention and are not intended in any way to limit the invention. All percentages and parts are based on weight unless otherwise indicated.

EXAMPLE 1

A reactor was charged with polyphenyl ether (MCS-192 manufactured by Monsanto), 11.26 ml, and hexane, 10 ml, and blanketed with nitrogen. t-Butyllithium (1.7M), 7 ml was added to the reaction and butane evolved slowly. Tetramethylene-diamine, 1 ml, was added without further evolution of butane. The reaction was charged with 0.1 m moles of triphenylstannyl chloride in tetrahydrofuran. The product was extracted with water/ether, then with ether layer, followed by washing with sodium hydroxide (1M) and water. The product was dried over magnesium sulfate, filtered and solvent stripped. The product, triphenylstannyl polyphenyl ether contained 9.16 percent tin. About one of ten phenoxy rings were substituted by triphenylstannyl groups.

EXAMPLE 2

Polyphenyl ether base stock was formulated with 10 percent triphenylstannyl polyphenyl ether compound described in Example 1. The test sample was tested for corrosion and oxidation stability.

A 20 ml test sample was subjected to oxidative, thermal and catalytic environment according to the Federal Test Method Standard 791 C1 Method 5307.2, "Corrosiveness and Oxidation Stability of Aircraft Turbine Engine Lubricants". The test temperature was 300° C., air flow rate one liter per hour and the test duration 24 hours. Post tests included determination of changes in viscosity by the ASTM D445 method, total acid number (TAN) and changes in weights of test metals.

The results in Table I indicate that the compound of the invention imparts stability to the base oil as indicated by viscosity measurements. The viscosity changes as a function of oxygen consumption of the samples inhibited with the compound of the invention and shows its effectiveness as an antioxidant. There is a slight, acceptable deposit on all metals and no visible etching of the metals.

The above embodiments have shown various aspects of the present invention. Other variations will be evident to those skilled in the art and such modifications are intended to be within the scope of the invention as defined by the appended claims.

TABLE I

| Test Sample | Weight Percent | |
|---|---|---|
| | 1 | 2 |
| Base oil | 100 | 90 |
| Additive, Example 1 | — | 10 |
| Physical Properties | | |
| Fluid loss, percent | 1.3 | 2.2 |
| Viscosity | | |
| Initial at 40° C., cs | 273.4 | 328.5 |
| Change at 40° C., percent | 133.9 | 30.0 |
| Initial at 100° C., cS | 12.69 | 13.36 |
| Change at 100° C., percent | 46.7 | 28.4 |
| Initial TAN, mg KOH/g | 0.00 | 0.02 |
| TAN Change, mg KOH/g | 0.22 | 0.25 |
| Metal weight change, mg/cm$^2$ | | |
| Ti | 0.0 | 0.1 |
| CR-M50 | 0.0 | 0.0 |
| Ag | 0.1 | −0.1 |
| Al | 0.0 | 0.1 |
| M-50 steel | 0.0 | 0.1 |

What is claimed is:

1. An aviation lubricating composition comprising a major amount of a synthetic lubricating base oil and an oxidation inhibiting amount of an organotin compound of the formula

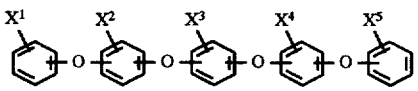

wherein $X^1$, $X^2$, $X^3$, $X^4$ and $X^5$ are independently selected from hydrogen and a tin group

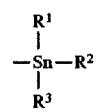

and $R^1$, $R^2$ and $R^3$ are independently selected from phenyl and phenoxyphenyl groups, and isomeric mixtures thereof with the proviso that at least one of $X^1$, $X^2$, $X^3$, $X^4$ and $X^5$ is the tin group

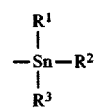

2. A lubricating composition of claim 1 wherein $R^1$, $R^2$ and $R^3$ are phenyl.

3. A lubricating composition of claim 1 wherein the base oil is polyphenyl ether.

4. A lubricating composition according to claim 1 wherein the organotin compound is present in the amount of 0.05 to 15.0 weight percent based on the weight of the lubricating composition.

5. A method for lubricating an aviation turbine engine to withstand high loads, extreme pressure and metal corrosion comprising operating the engine with a lubricating composition comprising a major amount of a synthetic lubricating base oil and a minor amount of organotin compound of the formula

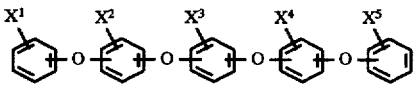

wherein $X^1$, $X^2$, $X^3$, $X^4$ and $X^5$ are independently selected from hydrogen and a tin group

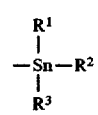

and $R^1$, $R^2$ and $R^3$ are independently selected from phenyl and phenoxyphenyl group, and isomeric mixtures thereof.

6. A method according to claim 5 wherein $R^1$, $R^2$ and $R^3$ are phenyl.

* * * * *